Patented Aug. 25, 1931

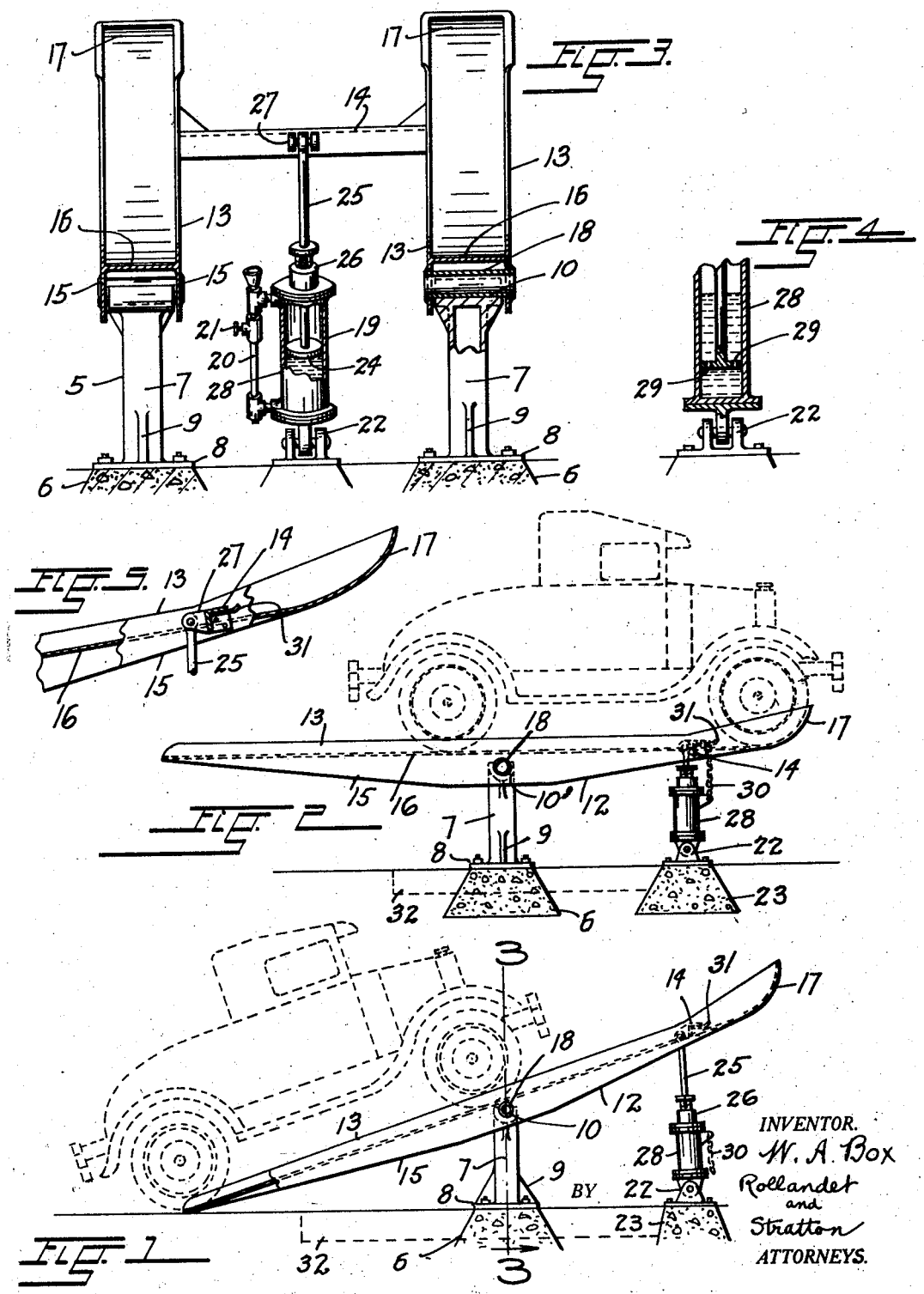

1,820,267

UNITED STATES PATENT OFFICE

WILLIAM A. BOX, OF DENVER, COLORADO

AUTOMOBILE LIFT

Application filed August 13, 1929. Serial No. 385,580.

This invention relates to lifts for automobiles and more particularly to apparatus used at filling stations and garages to elevate a motor vehicle whereby to afford access to parts beneath the same for the purposes of repair, adjustment, lubrication or cleaning, or for draining the crank case prior to supplying the same with fresh oil.

It has been customary heretofore to elevate the automobile by a lift operated by compressed air or other power, and it is the primary object of the present invention to provide a mechanism adapted to act as a medium for lifting an automobile to the desired elevation under its own power and by its own weight.

With this object in view, the invention consists in providing a pivotally supported track or runway onto which an automobile may move under its own power from the surface of the ground, and which may turn to a level or horizontal position by a preponderance of weight of the vehicle at one side of its pivotal axis or fulcrum.

A cushioned prop checks the movement of the track or runway and supports it in its horizontal position.

Other objects of the invention reside in novel arrangements and combinations of parts contributing to the production of apparatus of the above stated character, in which simplicity of construction is combined with practicability and efficiency in operation.

In the accompanying drawings in the several views of which like parts are similarly designated, Figure 1 represents a side elevation of the lift in its normal position, and Figure 2, a similar view showing the device after it has been moved to the horizontal position by the weight of an automobile driven onto its runway. In both these views, the vehicle has been shown in broken lines.

Figure 3 represents a vertical section taken on the line 3—3, Figure 1, and drawn to an enlarged scale, Figure 4, a fragmentary sectional view showing a modification of the cushioned stop, forming part of the apparatus, and Figure 5, an enlarged sectional view of the end of the runway which in the normal position of the same, is uppermost.

Referring further to the drawings, the lift comprises two upright standards 5 rigidly fastened upon foundations 6 that are preferably built below the surface of the ground or floor upon which the apparatus is installed.

The standards may consist of hollow columns 7 integral with feet 8 that are bolted to the foundations, and braced and reenforced by webs 9.

The columns have at their upper ends, concave seats 10 for the pivotal support of the runway 12.

The runway is composed of parallel rail members 13 of channel section, fastened together near one of their ends by means of an angular cross brace 14.

Each rail member may be composed of parallel side plates 15 and a floor plate 16 fastened together by welding.

One end of each rail member is open to admit the wheels of an automobile to its channel and the opposite end of each member is curved upwardly and closed to provide a stop 17 which arrests the movement of the wheels beyond said end.

The runway is provided with trunnions 18 fastened transversely beneath its rails, and movably fitted in the seats 10 of the standards.

By these means the runway is fulcrumed upon the standards, and the parts of the runway at opposite sides of its fulcrum, are proportioned with reference to weight, so that the runway extends normally in a slanting position in which the open ends of its channeled rail members rest upon the ground or floor on which the lift is installed, as illustrated in Figure 1.

A cushioned prop or stop element which in the operation, supports the runway in a horizontal position, consists in the form shown in Figures 1 to 3 of the drawings, of a hydraulic brake composed of a closed cylinder 19 having ports at its opposite ends, that are connected by a by-pass provided by a pipe 20. A valve 21 in the pipe regulates the flow of fluid between the ports.

The cylinder is at one end pivotally mounted in a bearing 22 upon a foundation 23 preferably built below the ground or floor on which the lift is installed.

A piston 24 is slidably fitted in the cylinder, and the rod 25 of the piston passes through a stuffing box 26 at the free end of the cylinder, to pivotally connect with a bracket 27 on the cross bar 14 of the runway.

The cylinder contains a quantity of viscous liquid, such as oil or glycerine, and this body of liquid, shown at 28, functions as a hydraulic cushion to check the downward movement of the runway to a horizontal position.

As a variation of the above described construction, the by-pass of the brake may be omitted, in which case the piston is provided with small apertures 29 through which the fluid may leak from one side of the piston to the other, as shown in Figure 4.

It is to be understood that a pneumatic cushion or a mechanical spring cushion may be substituted for the liquid cushion, without departing from the spirit of the invention and that the hydraulic brake element may function only as a governor to restrict the movements of the runway in which case, a stop separate from the brake element can be provided to support the runway in its horizontal position. The provision of such a stop is so obvious and so well known in the art that further illustration is unnecessary.

As a safeguard against accidental return movement of the runway after it has been moved to its horizontal position, the cylinder and the cross bar are provided respectively with a chain 30 and a hook 31 which cooperatively lock the runway against retrograde motion.

In the operation of the lift, the automobile to be raised, is driven onto the runway in its slanting position, as illustrated in Figure 1.

As soon as a preponderance of weight of the vehicle is at the upper side of the runway with reference to its fulcrum, the runway will slowly move about its fulcrum to the horizontal position shown in Figure 2, its downward movement being restricted by the cushion hereinbefore described.

The runway in its horizontal position, is supported by the piston in the cylinder which thus acts as a prop or stop, and the runway may be further secured in its horizontal position by the chain 30 and hook 31 or other similar device or devices.

The resistance to the downward motion of the runway produced in the hydraulic brake, is measured by proper adjustment of the valve, so that the vehicle driven onto the runway may remain in motion until the runway has assumed its horizontal position, when further motion of the vehicle may be arrested by shutting off its power and braking its wheels in the usual manner.

The vehicle may subsequently be lowered to the ground by reversing its movement, it being evident that the runway under the restricting influence of the brake will slowly return to its original slanting position after the preponderance of weight of the rearwardly moving vehicle, is at the side of the fulcrum at which the vehicle entered the runway at the beginning of the operation.

In order to lower the height to which the vehicle must be elevated in order to afford ready access to its underside, a pit may be dug beneath the runway, as shown at 32 in Figure 1.

What I claim and desire to secure by Letters Patent is:

1. An automobile lift comprising a runway mounted to move from a slanting position to a horizontal position by the weight of an automobile driven thereonto, and a fluid cushioning unit effective to yieldingly oppose movement of the runway in opposite directions, said fluid cushioning unit including means to automatically arrest movement of the runway beyond a horizontal position and to support the runway in a horizontal position.

2. An automobile lift comprising a runway mounted to move from a slanting to a horizontal position by the weight of an automobile driven thereonto and a regulatable fluid cushioning unit effective to yieldingly oppose said movement, said unit including means to automatically arrest movement of the runway beyond a horizontal position and to support the runway in a horizontal position.

3. An automobile lift comprising a runway pivoted to move from a slanting position to a horizontal position by the weight of an automobile driven thereonto, and a self-contained hydraulic brake-element at a side of the pivotal axis, adapted to automatically restrict the movement of the runway, said brake element being constructed, and located relative to the pivotal axis to form a positive support for the runway when in a horizontal position.

4. An automobile lift comprising a runway pivoted to move from a slanting position to a horizontal position by the weight of an automobile driven thereonto, and a self-contained hydraulic brake-element at a side of the pivotal axis, adapted to automatically restrict the movement of the runway in opposite directions.

5. An automobile lift comprising a runway pivoted to move from a slanting position to a horizontal position by the weight of an automobile driven thereonto, and a self-contained hydraulic brake-element at a side of the pivotal axis to automatically restrict the movement of the runway, including a cylinder and a piston therein, and having means for transferring a liquid from one side of the piston to the other by operative movement of the piston.

6. An automobile lift comprising a runway pivoted to move from a slanting position to a horizontal position by the weight of an automobile driven thereonto, and a self-contained hydraulic brake-element at a side of the pivotal axis to automatically restrict the movement of the runway, including a pivoted cylinder, and a piston in the cylinder, in pivotal connection with the runway, the hydraulic brake-element having means for transferring a liquid from one side of the piston to the other during operative movement of the piston.

7. An automobile lift comprising a runway mounted to move from a slanting position to a horizontal position by the weight of an automobile driven thereonto, and a combined cushioning and stop element automatically cushioning the movement of the runway and automatically arresting said movement at a predetermined point.

8. An automobile lift comprising a runway mounted to move from a slanting position to a horizontal position by the weight of an automobile driven thereonto, and a stop-element capable of supporting the runway in a horizontal position, and comprising two members one of which is movable relative to the other, to a determinate point of rest, and means to cushion the movement of the movable member.

9. An automobile lift comprising a runway mounted to move from a slanting position to a horizontal position by the weight of an automobile driven thereonto, and a stop-element capable of supporting the runway in a horizontal position, and comprising two members one of which is movable relative to the other, to a determinate point of rest, and means to cushion the movement of the movable member in opposite directions.

10. An automobile lift comprising a runway pivoted to move from a slanting position to a horizontal position by the weight of an automobile driven thereonto, and a combined cushioning and stop element automatically cushioning the movement of the runway and automatically arresting said movement at a predetermined point, said runway comprising a pair of tracks and a cross brace adjacent one end thereof, said cross brace connecting the tracks, and said element being connected to the runway intermediate the ends of the brace.

11. An automobile lift comprising a base, a runway mounted thereon to move from a slanting position to a horizontal position by the weight of an automobile driven thereonto and a combined cushioning and stop element automatically cushioning the movement of the runway, and automatically arresting said movement at a predetermined point, said runway comprising a pair of tracks and a cross brace adjacent one end thereof, said cross brace connecting the tracks, and said element being pivoted to said brace and to said base.

12. An automobile lift comprising a base, a runway mounted thereon to move from a slanting position to a horizontal position by the weight of an automobile driven thereonto, a combined cushioning and stop element automatically cushioning the movement of the runway and automatically arresting said movement at a predetermined point, said element being pivotally connected to said base and to said runway adjacent an end of the runway.

13. An automobile lift comprising a base, a runway mounted thereon to move from a slanting position to a horizontal position by the weight of an automobile driven thereonto, a combined cushioning and stop element automatically cushioning the movement of the runway and automatically arresting said movement at a predetermined point, said element comprising two members engageable with each other, one of which is movable relative to the other to a determinate point of rest, one of said members being pivoted to the runway and the other to the base.

14. An automobile lift comprising a runway pivoted to move from a slanting position to a horizontal position by the weight of an automobile driven thereonto, said runway having a pivotal axis and having its weight proportioned so that it is heavier on one side of the axis than the other, and a self-contained hydraulic brake element beneath the lighter side of the runway and connected thereto, said element being effective to automatically restrict the movement of the runway, said brake element being constructed and located relative to the pivotal axis to form a positive support for the runway when in a horizontal position.

15. An automobile lift comprising a runway mounted to move from a slanting position to a horizontal position by the weight of an automobile driven thereonto, and a combined cushioning and stop element automatically cushioning the movement of the runway and automatically arresting said movement at a predetermined point, said runway having stop members at one end.

In testimony whereof I have affixed my signature.

WILLIAM A. BOX.